United States Patent [19]

Yamaguchi

[11] Patent Number: 5,511,155
[45] Date of Patent: Apr. 23, 1996

[54] METHOD AND DEVICE FOR SYNTHESIZING ALL-OBJECTS-IN-FOCUS IMAGES

[75] Inventor: Hirohisa Yamaguchi, Ibaraki, Japan

[73] Assignee: Texas Instruments Incorporated, Dallas, Tex.

[21] Appl. No.: 187,269

[22] Filed: Jan. 27, 1994

[30] Foreign Application Priority Data

Jan. 27, 1993 [JP] Japan .................................. 5-011837

[51] Int. Cl.⁶ .................................................. G06T 5/00
[52] U.S. Cl. ........................ 395/133; 395/128; 395/135; 395/136; 356/359; 382/276
[58] Field of Search ........................... 395/118–122, 125, 395/127, 128, 129, 133, 135, 136; 382/6; 342/179; 356/359

[56] References Cited

U.S. PATENT DOCUMENTS

| 4,929,951 | 5/1990 | Small | 342/179 |
| 5,112,129 | 5/1992 | Davidson et al. | 356/359 |
| 5,117,466 | 5/1992 | Buican et al. | 382/6 |

*Primary Examiner*—Imis R. Jankus
*Attorney, Agent, or Firm*—David S. Guttman; Richard L. Donaldson

[57] ABSTRACT

A method and apparatus for forming a synthesized optical image with all of the desired objects in focus. A prescribed number of optical images of the same scene are provided by recording an optical image at a respective focal distance and changing the focal distance for each additional optical image as recorded. The optical images are subjected to wavelet transformation to form a multi-resolution representation. The coefficients of the various multi-resolution representations are compared at the same position to detect the maximum spectral amplitudes. Based on the detected maximum spectral amplitudes, another multi-resolution representation is obtained. Then, an inverse wavelet transformation is performed to obtain the synthesized optical image.

3 Claims, 7 Drawing Sheets

METHOD AND DEVICE FOR SYNTHESIZING ALL-OBJECTS-IN-FOCUS IMAGES

This invention concerns a method for synthesizing optical images. More specifically, this invention concerns a method for synthesizing multiple optical images obtained by changing the focal distance.

BACKGROUND OF THE INVENTION

When a camera is used to record optical images and objects relatively far from the camera lens are in focus, objects nearer to the camera lens are out of focus and their recorded images are blurred. On the other hand, when focusing on the nearer objects, the farther objects are out of focus and their recorded images are blurred. This problem is believed to be related to the intrinsic characteristics of the optical system. According to a basic optical principle, a pinhole lens has an infinite focal depth, and all objects are in focus when their images are recorded within the pinhole lens of a pinhole camera. However, for the [ideal] pinhole lens, the hole is so small that not even a single photon can pass through it, and hence no image is formed. That is, it is merely a hypothetical lens.

Due to this basic physical limitation, the lens has a finite focal depth, and the picture of the object is taken by means of automatic or manual focusing. However, when two objects, one nearer the camera and the other farther away from it, are to be photographed in the same picture, it is impossible to bring both into focus at the same time. That is, while bringing one object into focus, the other goes out of focus and its image becomes blurred. This is a disadvantage.

Although not a technology for forming a synthesized image, a technology known as inverse filtering has been tested which attempts to create a clear image from the blurred portion of a picked-up image by means of enhancing the blurred portion. However, since it also amplifies noise, it fails to reach the stage of practical applications.

OBJECT OF THE INVENTION

An object of this invention is to provide a method for forming a synthesized image in which multiple optical images picked up at different focal distances are synthesized, and all of the objects are in focus in the synthesized image.

SUMMARY OF THE INVENTION

This invention provides a method for obtaining a synthesized image while bringing objects at different positions into focus by means of digital signal processing using multiple image representations. The method for synthesizing optical images in accordance with the present invention comprises the following steps: a step in which from the various image element signals of the multiple optical images added at different focal distances, wavelet transformation is performed to obtain multi-resolution representations with a number corresponding to the number of the aforementioned optical images; a step in which the various coefficients of the aforementioned multi-resolution representations corresponding to the aforementioned optical images are compared at the same position, so as to detect the maximum spectral amplitude at each of the prescribed positions; a step in which the synthesized multi-resolution representation is derived based on the maximum spectral amplitude detected at each of the aforementioned prescribed positions; and a step in which the image element signals are formed from the aforementioned synthesized multi-resolution representation by means of inverse wavelet transformation.

BRIEF DESCRIPTION OF THE DRAWINGS

FIG. 10 is a diagram illustrating a portion of the program in an embodiment of the forward transformation of a multi-resolution representation in accordance with the invention.

FIG. 11 is a diagram illustrating a portion of the program in an embodiment of the forward transformation of a multi-resolution representation in accordance with the invention.

FIG. 12 is a diagram illustrating a portion of the program in an embodiment of the inverse transformation of a multi-resolution representation in accordance with the invention.

FIG. 13 is a diagram illustrating a portion of the program in an embodiment of the inverse transformation of a multi-resolution representation in accordance with the invention.

In reference numerals as shown in the drawings:

10, image device
20, pickup device
30, synthesis device
40, frame memory
I, synthesized image

DESCRIPTION OF THE PREFERRED EMBODIMENTS

Figure 1:
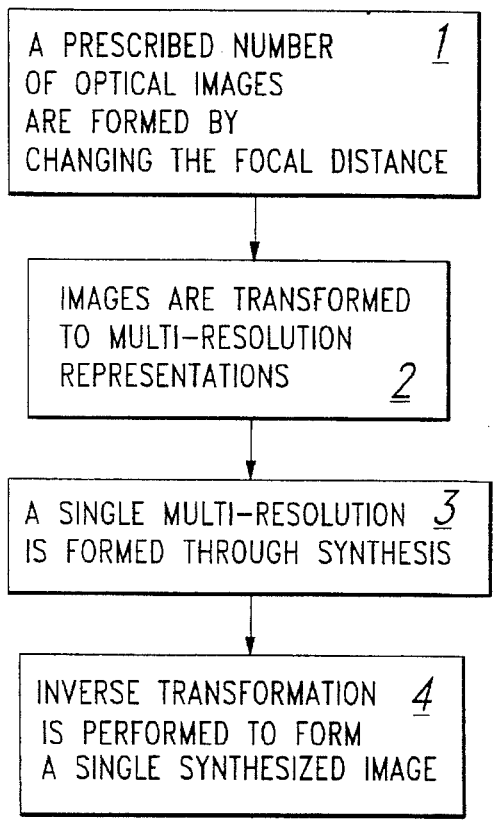
FIG. 1 is a flow chart illustrating an embodiment of a method for synthesizing optical images in accordance with the present invention.

FIG. 1 is a flow chart illustrating an embodiment of a method for synthesizing an optical image in accordance with the invention. First of all, multiple optical images are formed at respective different focal distances by changing the focal distance of the camera lens (step 1). It is possible to adjust the focal distance either linearly or nonlinearly in the range from infinity to zero. However, there is virtually no problem in specifying the focal distance itself. It is only necessary to focus to the extent to which all objects to be brought into focus can be extracted. An appropriate number of images are picked up in this step.

Then, the picked-up images are transformed to the multi-resolution representation (step 2). This multi-resolution representation is based on the multi-resolution technology discussed recently in mathematics (see: C. H. Chui: "An introduction to wavelets;" I. Daubechies: "Orthonormal bases of compactly supported wavelets." Communication of pure and applied mathematics, Vol. XLI 909–996 (1988)). Generally speaking, it is an isolation technology, in which, by means of special filtering and subsampling, the original signals are isolated into high-frequency and low-frequency components without increasing the total amount of data. A prominent feature of this isolation technology is that the aforementioned low-frequency component can be further isolated using the same filtering method. In this way, the operation can be repeated for the required number of cycles for the specific application. The layered signal representation in the frequency region generated in this way is usually called multi-resolution representation.

Then, the transformed multi-resolution representations are synthesized to form another new multi-resolution representation (step 3), followed by inverse multi-resolution representation to form the synthesized image (step 4). That is, the multiple multi-resolution representations corresponding to the images in focus at different distances are synthesized to form another multi-resolution representation, which is then subjected to an inverse transformation to obtain a synthesized image in which the various objects are optimally in focus.

Figure 2:
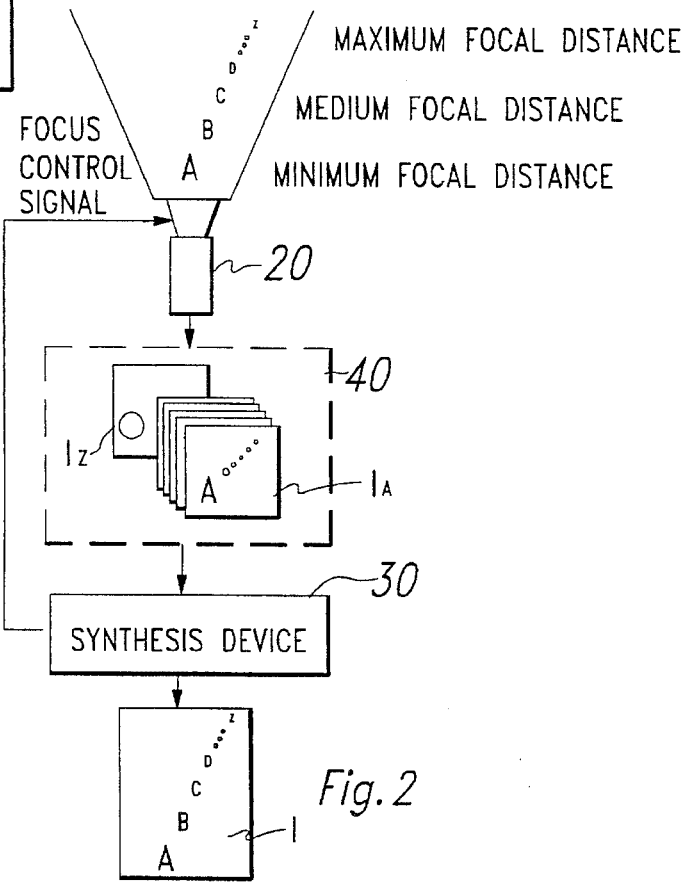
FIG. 2 is a block diagram illustrating an embodiment of an apparatus for implementing the method for synthesizing optical images in accordance with the present invention.

FIG. 2 is a diagram illustrating an example of the image equipment apparatus for implementing the method of this invention. In this example, the method and equipment for forming a synthesized image I for which optimal focusing is realized for all of the objects, from object A, nearest to the image equipment 10 to object Z, farthest away from it. Pickup device 20 first focuses on object A (with the shortest focal distance) and its optical image (image $I_A$) is recorded via a CCD (not shown in FIG. 2) in frame memory 40. Then, the pickup device 20 focuses on object B (with the focal distance increased slightly), and its image is recorded in another frame memory (or on another region in the same frame memory). In the same way, the operation is performed in order until focusing of the most remote object Z (with focal distance up to infinity) is performed, and its image $I_Z$ is recorded in the corresponding frame memory. (For the various objects, there is no need to record A in $I_A$, B in $I_B$, etc., they may be matched to $I_n$ (n=A, . . . , Z) in any [order]. However, in the present example, it is assumed that A is focused to form $I_A$, B is focused to form $I_B$, . . .) Focusing for objects A–Z is carried out by means of the control signals from synthesis device 30. However, it may also be performed manually or by means of other control equipment. The order in which the images are picked up can be selected at will. The method to be explained later is used to synthesize images $I_A$–$I_Z$ recorded in the various frame memories by means of synthesis device 30, forming synthesized image I. The memory may be in the form of a magnetic memory or an optical memory. It is also possible to input the picked-up signals into synthesis device 30. Also, photoelectric conversion equipment other than a CCD may be used as well.

Figure 3:
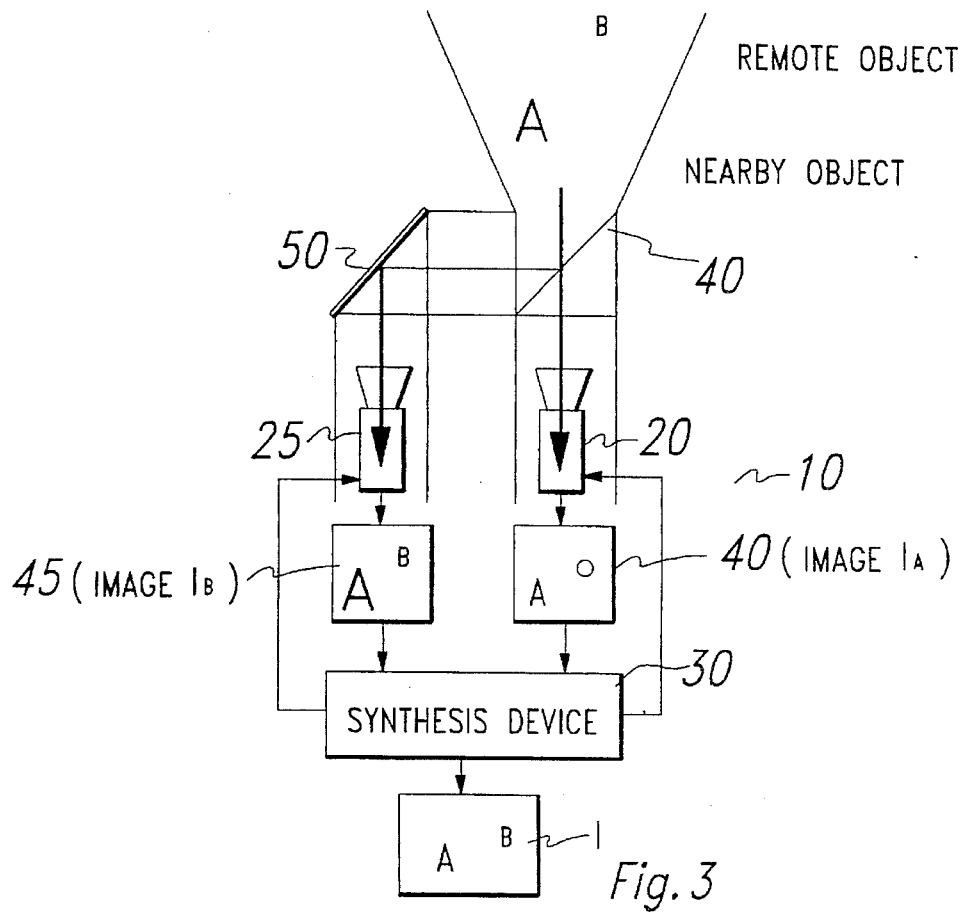
FIG. 3 is a block diagram illustrating another embodiment of an apparatus for implementing the method for synthesizing optical images in accordance with the present invention.

FIG. 3 illustrates another embodiment of the apparatus. It differs from the case shown in FIG. 2 in that it has multiple pickup devices. For simplicity, only two pickup devices 20 and 25 are shown in FIG. 3. The input optical information is equally divided between half-mirror 40 and mirror 50, and the portions are input into pickup device 20 and pickup device 25, respectively. Consequently, one of the pickup devices 20 or 25 focuses on object A (with a shorter focal distance) to add image $I_A$, which is then recorded in frame memory 40. Then the other pickup device focuses on object B (with a longer focal distance) to capture image $I_B$, which is recorded in frame memory 45. Then, by using a method to be explained later, an image I, which corresponds to the optimal focusing for both objects A and B, is formed by means of a synthesis device 30.

Figure 4:
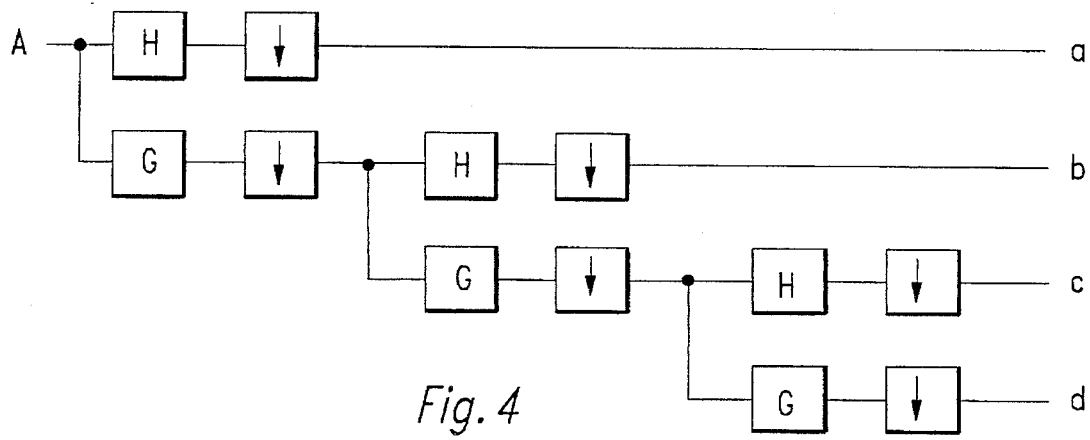
FIG. 4 is a schematic diagram illustrating an embodiment for implementing multi-resolution representation in accordance with the invention.

In the following, the multi-resolution representation using the wavelet coefficients executed by synthesis device 30 will be explained. As shown in FIG. 4, image element signal A from the frame memory is isolated into four wavelet transformations a, b, c, and d by means of a hierarchical filter bank. Filters H and G correspond to high-pass and low-pass filters, respectively, and are complementary to each other (mirror filters). Filters G and H are called wavelet filters when filtering and subsampling (blocks indicated by arrows) to form the orthogonal isolation of the input signal. FIG. 4 is a diagram illustrating the case of 3-layer isolation of the signal by means of one-dimensional (in either the horizontal or vertical direction) filtering. For the 2-dimensional filtering adopted in this invention, sequential filtering is performed in the horizontal and vertical directions. That is, after execution of filtering in the horizontal direction (or vertical direction), filtering in the vertical direction (or horizontal direction) is executed in this configuration.

Although a frequency domain representation, the multi-resolution representation also has spatial information (information related to position). On the other hand, for the Fourier transform, although a good representation in the frequency domain can be realized, no spatial information can be preserved; hence, the position cannot be specified (the uncertainty principle).

Next, the synthesis of multi-resolution images by means of multi-resolution representation will be explained. The multi-resolution representation using wavelet transformation is a representation of the input signal in the frequency domain. This representation also represents spatial information at the same time. In the multi-focus synthesis method, N multiple input images recorded for the same scene followed by wavelet transformation are the objects, and the wavelet coefficients that represent the most intense high-frequency component at each image element position are selected, since they are taken as the representation of the focal image at the aforementioned position. This process is executed for all of the image element positions of the image. By means of synthesis of the image elements selected for one multi-resolution representation detected at each position, a new multi-resolution representation can be formed with all of the image elements optimally focused. If needed, the aforementioned process may be not implemented for the lowest position at which the wavelet coefficients have almost the same value.

On the other hand, for the aforementioned synthesis, it is necessary to evaluate the spectral distribution of the image by changing the focal distance. Consequently, the Fourier transform of the overall image or partial small blocks (such as the cosine transform method used as a basic technology of image compression) may be considered. However, in this approach, the spectral lines and ends of lines usually expand into multiple coefficients, and this phenomenon makes the frequency and position information unclear. Consequently, in the wavelet transformation, these two types of information are preserved, and hence it is basically appropriate for use in the multi-focus synthesis method.

Figure 5:
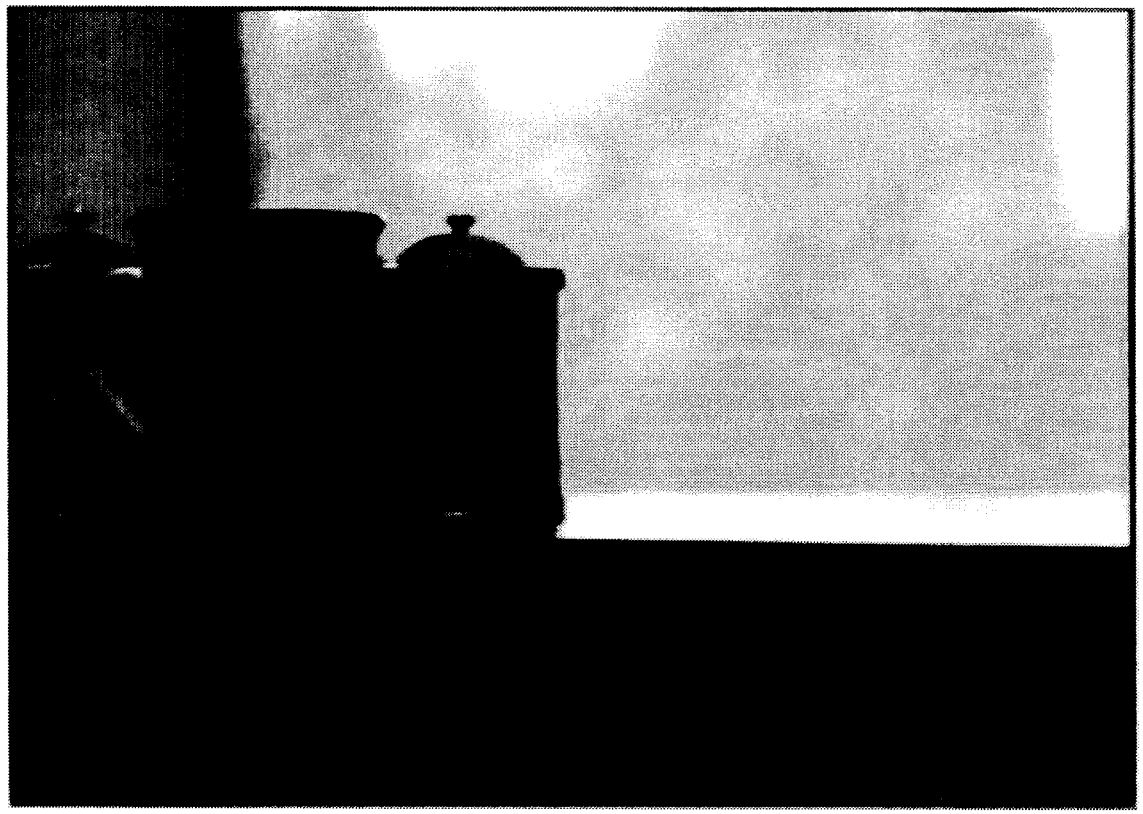
FIG. 5 is a photograph taken with a camera lens system picking up and focusing on a nearby object.
Figure 6:
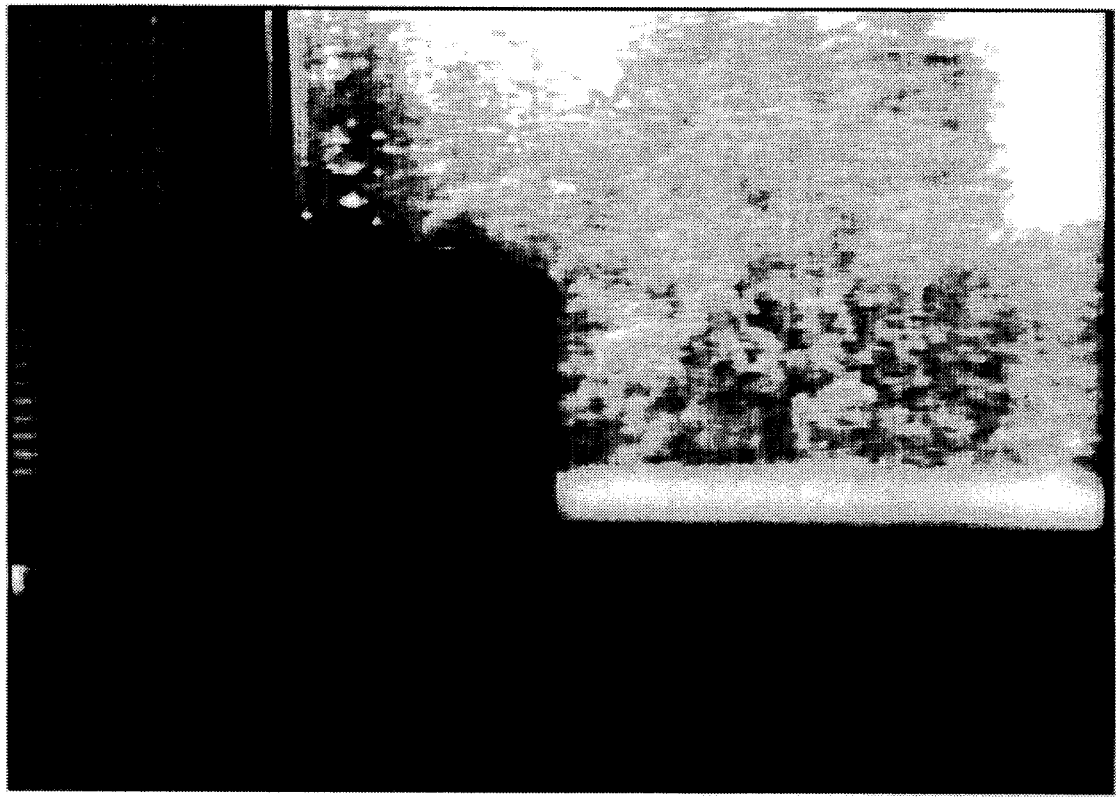
FIG. 6 is a photograph of the same scene shown in FIG. 5, but with the camera lens system picking up and focusing on a remote object.
Figure 7:
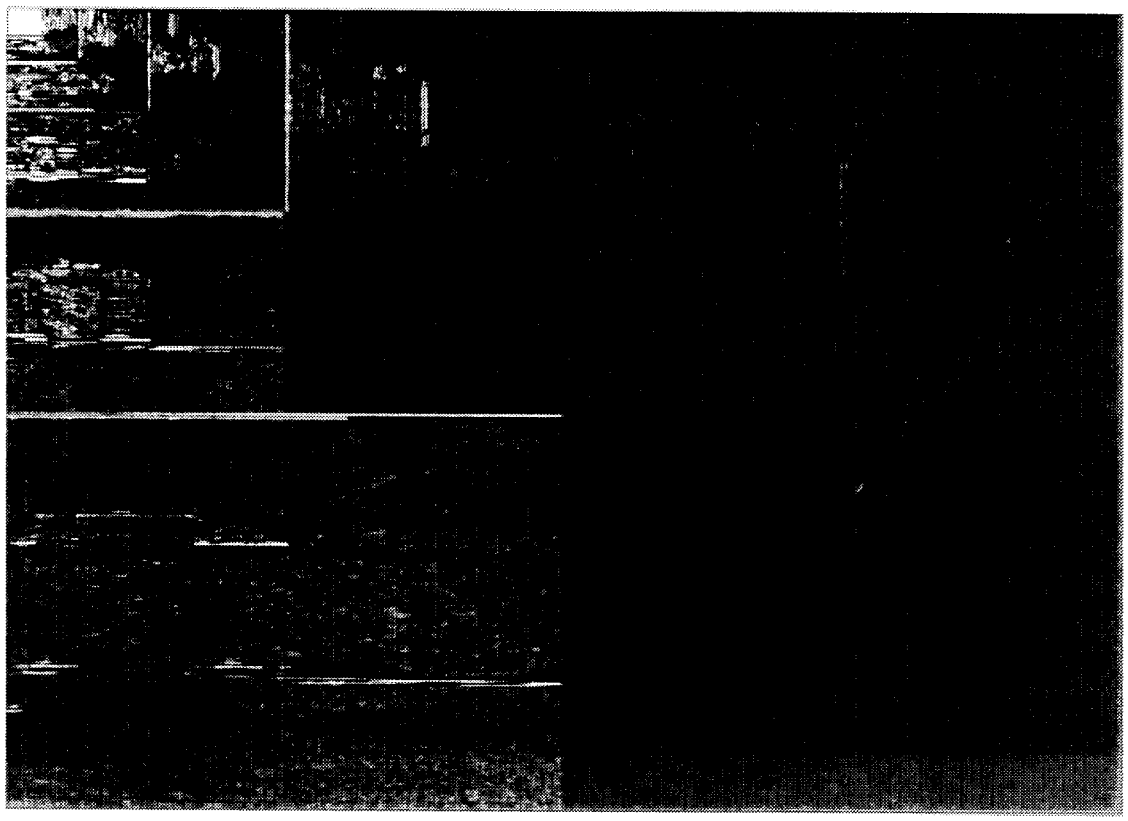
FIG. 7 is a diagram illustrating a multi-resolution representation of the optical image shown in FIG. 5 as an embodiment of this invention.
Figure 8:
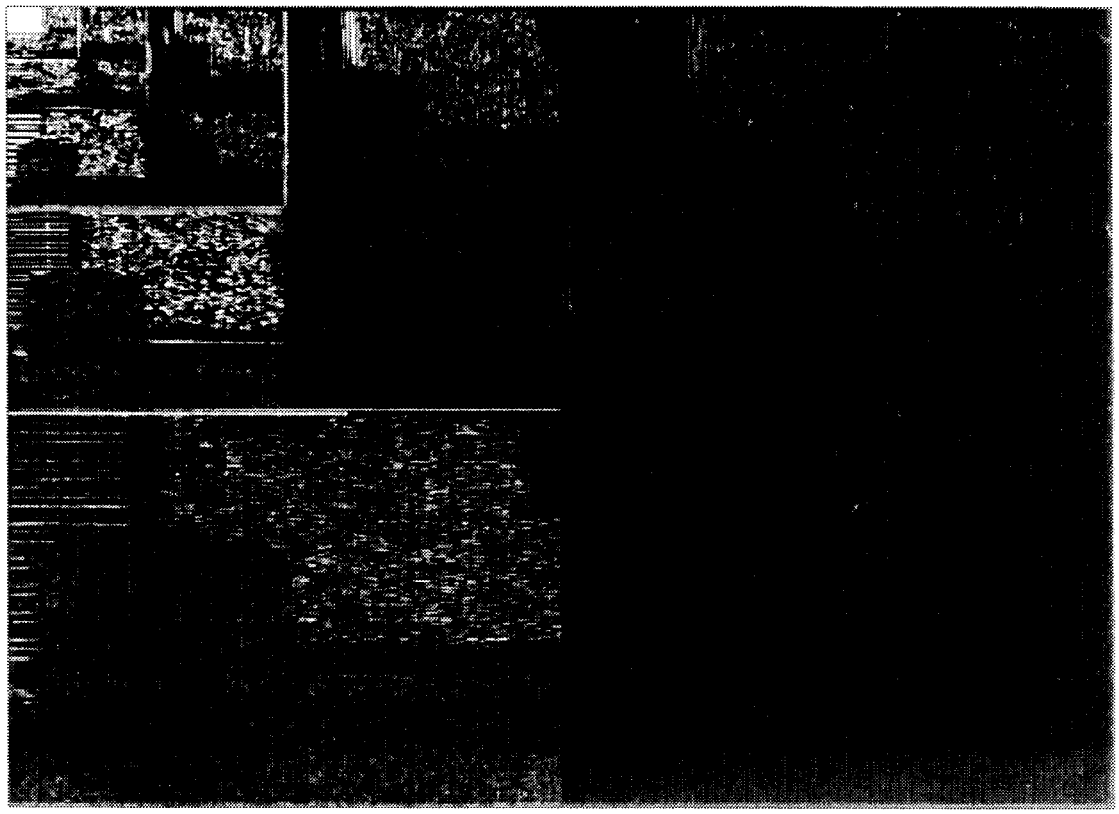
FIG. 8 is a diagram illustrating a multi-resolution representation of the optical image shown in FIG. 6 as an embodiment of this invention.

FIG. 5 is a photograph which illustrates the optical image provided by focusing on a nearby cup. FIG. 6 is a photograph which illustrates the optical image provided by focusing on a remote tree in the same scene shown in FIG. 5. FIGS. 7 and 8 show the multi-resolution representations for the images of FIGS. 5 and 6, respectively. For FIGS. 5 and 6, the original image is represented by means of 704 pixels×480 lines. They are isolated into 5 frequency bands shown in FIGS. 7 and 8. In the 2-dimensional multi-resolution representation, the lower right corresponds to the higher frequency components. The lowest layer (the upper left corner) corresponds to the lowest frequency components, and it can be taken as the image which can pass through the lowest low-pass filter (and subsampled).

In the case of multi-focus synthesis, the scenes of the same image are photographed for the desired number of cycles by a camera (or multiple cameras) at different focal distances. However, for the lowest layer generated by the lowest low-pass filtering operation, even when photographing at different focal distances, the images obtained are still almost identical. (In other words, it is preferred that the number of layers be set to make the lowest frequency layers almost identical). The lowest frequency layer represents the mean brightness of the image.

On the other hand, for the higher frequency layers, the higher spectral components appear at various positions in the multi-resolution representation, and they correspond well to the objects in focus at the various focal distances.

Consequently, when the multi-resolution representation is adopted, the following takes place:

(1) In the lowest frequency layer (the 15 pixel×22 lines on the upper left corner in FIGS. 7 and 8), each coefficient is derived as an average of multiple input images, or by extraction from the coefficients of a prescribed image. It is used as the lowest frequency layer of the synthesized image.

(2) For the upper layers, at each position, there is a multi-resolution representation that gives the maximum spectral amplitude (maximum absolute value). That is, for the multi-resolution representation that gives the maximum spectral amplitude at position of i, j, as the simplest method, $$\max(|A_{i,j}^{(1)}|, |A_{i,j}^{(2)}|, \ldots, |A_{i,j}^{(N)}|) \quad (1)$$

is used as the representation (N= number of the multi-resolution representation, that is, number of the optical images added). It corresponds to the optimal focusing of the input scene, and the corresponding multi-resolution coefficients give the information. The overall multi-resolution representation is formed according to this rule. In this way, at all of the positions, the multi-resolution representations that give the maximum spectral amplitude are detected, and they are synthesized to form the new multi-resolution representation. This rule itself is believed to have various forms.

Figure 9:
FIG. 9 is a synthesized photograph of the same scene shown in FIGS. 5 and 6, but illustrating a synthesized optical image in accordance with the present invention.

Then, based on the detected maximum spectral amplitude position, an inverse multi-resolution transformation is performed so that the synthesized multi-resolution representation is transformed to an optical image composed of image element signals. As shown in FIG. 9, this optical image is a synthesized image of a nearby cup and a far away tree, both of which are well in focus in the picture.

Although not directly related to this invention, depending on the method of synthesis, there are cases in which the frame sizes may differ. This is an influence of the zoom effect as related to focusing of the various optical images. If needed, the size may be changed using various adjustment methods, such as "enlargement," "contraction," "interpolation," "extraction," etc., before the synthesis operation.

FIGS. 10–13 illustrate portions of the program for the forward and inverse wavelet multi-resolution transforms.

The aforementioned synthesis method does not depend on the image techniques related to content, such as edge extraction, texture analysis, etc. The present method for synthesizing is completely different from methods with any precondition related to 3-dimensional objects. It is a method in which a stable synthesized result can be obtained with respect to all natural images. (That is, there is absolutely no generation of significant degradation in the case when the precondition is violated.) In addition, the edge analysis is still in the stage of initial development. When the number of edges is increased, the processing time increases exponentially. Consequently, it has not been used in practical applications. At present, the present method is the most appropriate method for practical applications for natural images.

Also, since it is based on detection of the maximum spectral amplitude from the multiple multi-resolution coefficients, there is no limitation to the number of optical images which can be added. By capturing multiple optical images, it is possible to obtain a synthesized image that is in focus at almost all positions. Also, enlargement is possible to obtain very correct 3-D information (distance, appearance of object, etc.)

In the above description, embodiments of this invention have been presented. However, this invention is not limited to these embodiments. This invention can be used with various types of equipment, such as cameras, television cameras, monitoring cameras, medical imaging cameras, etc.

This invention provides an effective method for forming a single synthesized optical image from multiple optical images added at different focal distances, with optimal focusing.

APPENDIX A

```
/*****************************************************/
/* Forward Wavelet Transform                         */
/* This subroutine performs the N=3 Daubichies       */
/* forward wavelet transform on image defined        */
/* as global variable "short YYcomponent".           */
/* The transformed results are stored back in        */
/* "YYcomponent".                                    */
/*                                                   */
/* 11/20/1992                                        */
/* Texas Instruments video/SIS/TRDC (Yamaguchi)      */
/*****************************************************/

ForwardWavelet (short YYcomponent [4] [500] [720], int Vsize, int Hsize, int layers, int component )
{
    short TEMPcomponent [500] [720];
```

APPENDIX A-continued

```
double HCoeff[11]={0,0,0,0, 0.332670552950, 0.806891509311, 0.459877502118,
                  -0.135011020010, -0.085441273882, 0.035226291882, 0};
                /* This is Daubichies filter of N=3 */
double GCoeff[11]={0, 0.035226291882, 0.085441273882, -0.135011020010, -0.459877502118,
                  0.806891509311, -0.332670552950, 0, 0, 0, 0};

register i,j,k;
int inttemp1
int refV, refH;
int resolution;

for (i=0;i<11;i++)
  {
    HCoeff[i]/=sqrt (2.0);
    GCoeff[i]/=sqrt (2.0);
  } for (resolution=0;resolution<=layers-1;resolution++)
  {
    for (refV=0; refV<Vsize;refV++) for (fefH=0; refH<Hsize;refH+=2)
      {
        inttemp=0;
        for (i=-5;i<=5;i++)
          {
            if (refH+i<0) inttemp+=YYcomponent [component] [refV] [-(refH+i)]*HCoeff[5-i];
            else if ((refH+i)>=(Hsize-1))
               inttemp+=YYcomponent [component] [refV] [(Hsize-1)*2-(refH+i)]*HCoeff[5-i];
            else inttemp+=YYcomponent [component] [refV] [refH+i]*HCoeff[5-i];
          }
        TEMPcomponent [refV][refH/2]=inttemp;

inttemp=0;
        for (i=-5;i<=5;i++)
          {
            if (refH+i<0) inttemp+=YYcomponent [component] [refV] [-(refH+i)]*GCoeff[5-i];
               inttemp+=YYcomponent [component] [refV] [(Hsize-1)*2-(refH+i)]*GCoeff[5-i];
            else inttemp+=YYcomponent [component] [refV] [refH+i]*GCoeff[5-i];
          }
        TEMPcomponent [refV][Hsize/2+refH/2]=inttemp;
      } for (refV=0;refV<Vsize;refV+=2) for (refH=0;refH<Hsize;refH++)
      {
        inttemp=0;
        for (i=-5;i<=5;i++)
          {
            if (refV+i<0) inttemp+=TEMPcomponent [-(refV+i)] [refH]*HCoeff[5-i];
            else if ((refV+i)>=(Vsize-1))
               inttemp+=TEMPcomponent [(Vsize-1)*2-(refV+i)] [refH]*HCoeff[5-i];
            else inttemp+=TEMPcomponent [refV+i] [refH]*HCoeff[5-1];
          }
        YYcomponent [component] [refV/2] [refH]=inttemp;

inttemp=0;
        for (i=-5;i<=5;i++)
          {
            if (refV+i<0) inttemp+=TEMPcomponent[-(refV+i)] [refH]*GCoeff[5-i];
            else if ((refV+i)>=(Vsize-1))
               inttemp+=TEMPcomponent[(Vsize-1)*2(refV+i)] [refH]*GCoeff[5-i];
            else inttemp+=TEMPcomponent [refV+i] [refH]*GCoeff[5-i];
          }
        YYcomponent [component] [Vsize/2+refV/2] [refH]=inttemp;
      }
    Hsize=Hsize/2; Vsize=Vsize/2;
  }
}
```

APPENDIX B

```
/***************************************************/
/* Inverse Wavelet Transform                        */
/* This routine performs the N=3 Daubichies         */
/* inverse wavelet transform on image defined       */
/* as global variable "short YYcomponent".          */
/* The transformed results are stored back in       */
/* "YYcomponent".                                   */
/*                                                  */
/* 7/30/1992                                        */
/* Texas Instruments video/SIS/TRDC (Yamaguchi)     */
/***************************************************/
InverseWavelet (short YYcomponent [4] [500] [720], int Vsize, int Hsize, int layers, int component)
{
    double HCoeff[11]={0,0,0,0,0, 0.332670552950, 0.806891509311, 0.459877502118,
                        -0.135011020010, -0.085441273882, 0.035226291882};
                    /* This is Daubichies filter of N=3 */
    double Gcoeff[11]={0, 0.035226291882, 0.085441273882, -0.135011020010, -0.459877502118,
                        0.806891509311, -0.332670552950, 0,0,0,0};

register i,j,k;
    int inttemp1, inttemp2;
    int refV, refH;

int resolution;

short YYtemp1 [500] [720];
    short YYtemp2 [500] [720];

for (i=0;i<11;i++)
      {
        HCoeff[i]*=sqrt(2.0);
        GCoeff[i]*=sqrt(2.0);
      } for (resolution=0;resolution<=layers-1;resolution++)
      {
        for (refV=0;refV<Vsize*2;refV++) for (refH=0;refH<Hsize;refH++)
          {
            YYtemp1 [refV] [refH*2]=YYcomponent [component] [refV] [refH];
            YYtemp1 [refV] [refH*2+1]=0;
            YYtemp2 [refV] [refH*2]=YYcomponent [component] [refV] [Hsize+refH];
            YYtemp2 [refV] [refH*2+1]=0;
          }
        for (refV=0; refV<Vsize*2;refV++) for (refH=0;refH<Hsize*2;refH++)
          {
            inttemp1=0; inttemp2=0;
            for (i=-5;i<=5;i++)
              {
                if (refH+i<0)
                  {
                    inttemp1+=YYtemp1 [refV] [-(refH+i)]*HCoeff[5+1];
                    inttemp2+=YYtemp2 [refV] [-(refH+i)]*GCoeff[5+1];
                  }
                else if ((refH+i)>=(Hsize*2-1))
                  {
                    inttemp1+=YYtemp1 [refV] [(Hsize*2-1)*2-(refH+i)]*HCoeff[5+i];
                    inttemp2+=YYtemp2 [refV] [(Hsize*2-1)*2-(refH+i)]*GCoeff[5+i];
                  }
                else
                  {
                    inttemp1+=YYtemp1 [refV] [refH+i]*HCoeff[5+i];
                    inttemp2+=YYtemp2 [refV] [refH+i]*GCoeff[5+i];
                  }
              }
            YYcomponent [component] [refV] [refH]=inttemp1+inttemp2;
          }
        for (refV=0;refV<Vsize;refV++) for (refH=0;refH<Hsize*2;refH++)
          {
            YYtemp1 [refV*2] [refH]=YYcomponent [component] [refV] [refH];
            YYtemp1 [refV*2+1] [refH]=0;
            YYtemp2 [refV*2] [refH]=YYcomponent [component] [Vsize+refV] [refH];
            YYtemp2 [refV*2+1] [refH =0;
          }
        for (refV=0;refV<Vsize*2;refV++) for (refH=0;refH<Hsize*2;refH++)
          {
            inttemp1=0; inttemp2=0;
            for (i=-5;<=5;i++)
              {
                if (refV+i<0)
```

APPENDIX B-continued

```
           {
               inttemp1+=YYtemp1 [-(refV+i)] [refH]*HCoeff[5+i];
               inttemp2+=YYtemp2 [-(refV+i)] [refH]*GCoeff[5+i];
           }
           else if ((refV+i)>=(Vsize*2-1))
           {
               inttemp1+=YYtemp1 [(Vsize*2-1)*2-(refV+i)] [refH]*HCoeff[5+i];
               inttemp2+=YYtemp2 [(Vsize*2-1)*2-(refV+i)] [refH]*GCoeff[5+i];
           }
           else
           {
               inttemp1+=YYtemp1 [refV+i] [refH[*HCoeff[5+i];
               inttemp2+=YYtemp2 [refV+i] [refH]*GCoeff[5+i];
           }
       }
       YYcomponent [component] [refV] [refH]=inttemp1+inttemp2;
    }
    Hsize*=2; Vsize*=2;
   }
}
```

I claim:

1. A method for synthesizing an all-objects-in-focus two-dimensional image of several objects at various corresponding object distances, comprising the steps of:

for each object capturing a corresponding pixel image focused at its object distance;

transforming each pixel image into a corresponding multi-resolution representation expressed as a set of coefficients;

comparing, at each image position, the various coefficients of the multi-resolution representations to detect the maximum spectral amplitude at each image position;

deriving a synthesized multi-resolution representation by using the coefficient having the maximum spectral amplitude at each image position;

reverse-transforming the synthesized multi-resolution representation by inverse wavelet transformation into a synthesized optimally focused image.

2. A method for synthesizing an all-objects-in-focus two-dimensional image of a scene of N objects ($O_1, O_2, O_3 \ldots O_N$) positioned at various corresponding object distances ($d_1, d_2, d_3 \ldots d_N$), comprising:

for each object capturing a corresponding two dimensional original pixel image ($I_1, I_2, I_3 \ldots I_N$) of the scene focused at its object distance;

transforming each original pixel image by wavelet transformation to obtain a corresponding multi-resolution representation comprising a set of stored coefficents ($A_{ij}^{(1)}, A_{ij}^{(2)}, A_{ij}^{(3)} \ldots A_{ij}^{(N)}$) corresponding to image positions (i,j) and spacial frequencies;

for each image position (i,j), selecting from among the N multi-resolution representations the coefficient of maximum spectral amplitude;

combining the selected multi-resolution coefficients into a synthesized multi-resolution representation $A_{ij}^{(MAX)}$; and reverse-transforming the synthesized multi-resolution representation by a reverse multiple-resolution transformation to create a synthesized optimally focused image.

3. A device for synthesizing an all-objects-in-focus two dimensional image of a scene of N objects ($O_1, O_2, O_3 \ldots O_N$) positioned at various corresponding object distances ($d_1, d_2, d_3 \ldots d_N$), comprising:

a camera for capturing for each object a corresponding two dimensional original pixel image ($I_1, I_2, I_3 \ldots I_N$) of the scene focused at its object distance;

a first filter for transforming each original pixel image by wavelet transformation into a corresponding multi-resolution representation comprising a set of stored coefficents ($A_{ij}^{(1)}, A_{ij}^{(2)}, A_{ij}^{(3)}, \ldots A_{ij}^{(N)}$) corresponding to image positions (i,j) and spacial frequencies;

a comparator for selecting for each image position (i,j) from among the N multi-resolution representations the coefficient of maximum spectral amplitude;

a synthesizer circuit for combining the selected multi-resolution coefficients into a synthesized multi-resolution representation $A_{ij}^{(MAX)}$; and a second filter for reverse-transforming the synthesized multi-resolution representation by a reverse multiple-resolution transformation to create a synthesized optimally focused image.

* * * * *